(12) United States Patent
Liu et al.

(10) Patent No.: US 8,468,572 B2
(45) Date of Patent: Jun. 18, 2013

(54) DISTRIBUTING DIGITAL VIDEO CONTENT TO MULTIPLE END-USER DEVICES

(75) Inventors: Xiaomei Liu, San Jose, CA (US); Alon Bernstein, Sunnyvale, CA (US); John Pickens, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 1103 days.

(21) Appl. No.: 12/055,772

(22) Filed: Mar. 26, 2008

(65) Prior Publication Data
US 2009/0249421 A1    Oct. 1, 2009

(51) Int. Cl.
*H04N 7/58* (2006.01)
*H04N 7/24* (2011.01)
*H04L 12/56* (2006.01)

(52) U.S. Cl.
USPC ............ 725/94; 725/96; 725/97; 725/98

(58) Field of Classification Search
None
See application file for complete search history.

(56) References Cited

U.S. PATENT DOCUMENTS

| | | | | |
|---|---|---|---|---|
| 5,530,695 | A * | 6/1996 | Dighe et al. | 370/232 |
| 6,192,083 | B1 * | 2/2001 | Linzer et al. | 375/240.29 |
| 6,996,838 | B2 * | 2/2006 | Rodriguez | 725/95 |
| 7,292,602 | B1 * | 11/2007 | Liu et al. | 370/468 |
| 7,533,192 | B2 * | 5/2009 | Otsuka et al. | 710/6 |
| 7,656,877 | B1 * | 2/2010 | Sharan et al. | 370/395.2 |
| 7,904,931 | B2 * | 3/2011 | Frederickson et al. | 725/93 |
| 2004/0143849 | A1 * | 7/2004 | Costa | 725/95 |
| 2006/0182139 | A1 | 8/2006 | Bugajski et al. | |
| 2006/0195881 | A1 | 8/2006 | Segev et al. | |
| 2006/0225118 | A1 * | 10/2006 | Rolls et al. | 725/118 |
| 2007/0081537 | A1 * | 4/2007 | Wheelock | 370/392 |
| 2007/0280294 | A1 | 12/2007 | Hunt et al. | |

FOREIGN PATENT DOCUMENTS

| | | |
|---|---|---|
| CA | 2322794 A1 | 12/1998 |
| WO | 0041395 A1 | 7/2000 |
| WO | 0041398 A1 | 7/2000 |
| WO | WO 00/41395 * | 7/2000 |
| WO | 2004025405 A2 | 3/2004 |
| WO | WO2004025405 A2 | 3/2004 |
| WO | 2004107634 A2 | 12/2004 |
| WO | 2006020559 A2 | 2/2006 |

OTHER PUBLICATIONS

Cisco Technology, Inc., International Search Report, Aug. 6, 2009, p. 1-4.

(Continued)

*Primary Examiner* — Vivek Srivastava
*Assistant Examiner* — Carmine Malangone
(74) *Attorney, Agent, or Firm* — Merchant & Gould

(57) ABSTRACT

A technique for managing the distribution of digital video content to multiple end-user devices is disclosed. The technique involves statistically multiplexing multiple VBR encoded video streams into an access channel, such as a data over cable service interface specifications (DOCSIS) bonded group, and utilizing quality of service capabilities of an edge device, such as a cable modem termination system (CMTS) or an edge quadrature amplitude modulation (QAM) device, to buffer and schedule IP packets, which carry the VBR encoded video streams, so that packets are not dropped during periods of congestion. Utilizing the quality of service capabilities of an edge device makes it possible to statistically multiplex VBR encoded video streams in a narrowcast application such as Video on Demand (VOD) or Switched Digital Video (SDV) while eliminating the need for process intensive transrating/transcoding operations.

18 Claims, 8 Drawing Sheets

OTHER PUBLICATIONS

Kuo, Wen-Kuang, Kumar, Sunil, Kuo, C.-C. Jay, "Bandwidth Allocation and Traffic Scheduling for DOCSIS Systems with QoS Support," 2002, IEEE.

Chen, Min, Wei, Gang, "Scheduling Algorithm for Real-time VBR Video Streams Using Weighted Switch Deficit Round Robin," 2003, IEEE.

Kuo, Wen-Kuang, Kumar, Sunil, Kuo, C.-C. Jay, "Improved Priority Access, Bandwidth Allocation and Traffic Scheduling for DOCSIS Cable Networks," Dec. 2003, IEEE Transactions on Broadcasting, Vo. 49, No. 4.

* cited by examiner

DISTRIBUTING DIGITAL VIDEO CONTENT TO MULTIPLE END-USER DEVICES

TECHNICAL FIELD

The present disclosure relates generally to digital video distribution networks, and more particularly, to techniques for distributing variable bitrate (VBR) encoded video streams to end-user devices.

BACKGROUND

Digital video content is typically encoded before transmission to end-user devices. The Motion Picture Experts Group (MPEG) standards are common video encoding schemes used for digital video encoding. MPEG allows a video stream to be encoded as a variable bitrate (VBR) video stream or a constant bitrate (CBR) video stream. While CBR encoded video streams have a fixed bandwidth requirement, CBR encoded video streams can result in variations in video quality. On the other hand, while VBR encoded video streams result in more consistent video quality, the bandwidth variations can lead to inefficiencies in bandwidth utilization.

When digital video content is broadcasted to multiple end-user devices, multiple VBR video streams are often multiplexed together based on statistical analysis of the multiple VBR encoded video streams, including consideration of the mean and peak bitrates. The process of statistically multiplexing multiple VBR video streams is referred to in the digital video broadcast world as "statmuxing." Even when statmuxing is used, there are times when the instantaneous bandwidth requirement of the multiplexed VBR video streams exceeds the output bandwidth capacity, a situation often referred to as congestion.

In conventional statmuxing operations, periods of congestion are managed by dynamically adjusting the encoding of the VBR video streams to reduce the instantaneous bandwidth requirement. This operation, referred to as "transcoding" or "transrating" is computationally expensive. In addition to the transcoding/transrating operation, conventional MPEG statmuxing introduces a jitter to the video streams in the range of 0.5-1.0 seconds.

Although most digital video content is distributed today via broadcasting, there is an ever growing demand for narrowcast digital video applications such as video on demand (VOD) and switched digital video (SDV). While VBR statmuxing of MPEG encoded digital video content works well in broadcast applications, it does not transfer so well to narrowcast applications such as VOD and SDV. For example, the transcoding of narrowcast video streams is expensive to implement at the edge of an access network and the jitter introduced by VBR statmuxing can significantly impact the user experience in narrowcast applications.

In view of the above, there is a need to be able to efficiently provide narrowcast video services while taking advantage of VBR encoding and statmuxing of VBR encoded video streams.

SUMMARY

A technique for managing the distribution of digital video content to multiple end-user devices involves statistically multiplexing multiple VBR encoded video streams into an access channel, such as a data over cable service interface specifications (DOCSIS) bonded group, and utilizing quality of service capabilities of an edge device, such as a cable modem termination system (CMTS) or an edge quadrature amplitude modulation (QAM) device, to buffer and schedule IP packets, which carry the VBR encoded video streams, so that packet drops during periods of congestion are avoided or minimized. Utilizing the quality of service capabilities of an edge device makes it possible to statistically multiplex VBR encoded video streams in a narrowcast application such as VOD or SDV while eliminating the need for process intensive transrating/transcoding operations. Any jitter added to the VBR encoded video streams as a result of buffering at the edge device can be compensated for with buffering at an end-user device such as an IP-compatible set top box (STB).

In an embodiment, post-buffering bitrate information is utilized to make statistical multiplexing decisions because the VBR encoded video streams tend to have smaller peak-to-mean ratios after buffering. In another embodiment, the efficiency with which the access channel is utilized can be controlled by adjusting the peak-to-mean ratios of the VBR encoded video streams.

In an embodiment, a method for managing the distribution of digital video content to multiple end-user devices involves encoding video streams using VBR encoding, encapsulating the VBR encoded video streams in IP packets, identifying an access channel, wherein the access channel is associated with a bandwidth limitation, admitting a plurality of the VBR encoded video streams to the access channel, wherein a sum of peak rates from all of the admitted VBR encoded video streams exceeds the bandwidth limitation of the access channel, using buffering and scheduling of the IP packets to manage periods when bandwidth demand from the assigned VBR encoded video streams exceeds the bandwidth limitation of the access channel, transmitting the VBR encoded video streams to at least one IP-compatible end-user device via the access channel, and de-encapsulating the VBR encoded video stream from the IP packets at the IP-compatible end-user device.

An embodiment of a system for distributing digital video content to multiple end-user devices includes an edge device configured to receive video streams that are encoded using VBR encoding and encapsulated in IP packets and end-user devices configured to receive and buffer IP packets of VBR encoded video streams and to de-encapsulate the VBR encoded video streams. The edge device is further configured to admit VBR encoded video streams to an access channel, wherein the access channel has a bandwidth limitation and wherein a sum of peak rates from all of the admitted video streams exceeds the bandwidth limitation of the access channel, use buffering and scheduling of the IP packets to manage periods when bandwidth demand from the admitted VBR encoded video streams exceeds the bandwidth limitation of the access channel, and transmit the VBR encoded video streams to the end-user devices in the IP packets.

Another technique for distributing digital video content to multiple end-user devices involves buffering VBR encoded video streams that are IP-encapsulated and statistically multiplexing multiple VBR encoded video streams using post-buffering rate information, including, for example, post-buffering mean and peak rate information. In an embodiment, a method for distributing digital video content to multiple end-user devices involves encoding video streams using VBR encoding, encapsulating the VBR encoded video streams in IP packets, transmitting the IP packets to an edge device, identifying an access channel that is used by the edge device, buffering the IP packets within the edge device, admitting VBR encoded video streams to the access channel using bitrate information related to the VBR encoded streams, wherein the bitrate information reflects post-buffering bitrates of the VBR encoded streams, transmitting the VBR encoded video streams to at least one IP-compatible end-user device, and de-encapsulating the VBR encoded video streams from the IP packets at the end-user device.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DESCRIPTION OF EXAMPLE EMBODIMENTS

Figure 1:
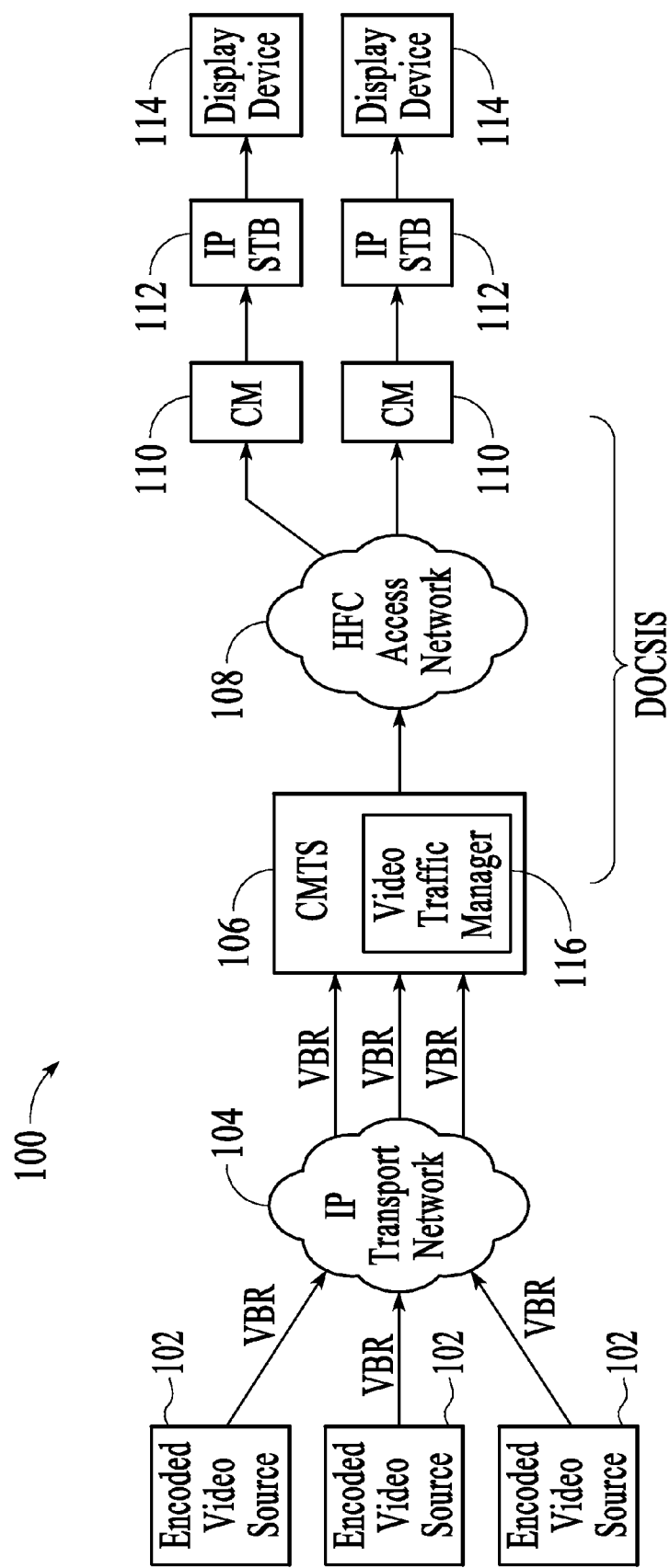
FIG. 1 depicts a system for distributing digital video content to multiple end-user devices that includes encoded video sources, an IP transport network, a CMTS, an HFC network, CMs, IP STBs, and display devices.

FIG. 1 depicts a system 100 for distributing digital video content to multiple end-user devices that includes encoded video sources 102, an IP transport network 104, a cable modem termination system (CMTS) 106, a hybrid fiber coaxial (HFC) access network 108, cable modems (CMs) 110, IP set top boxes (STBs) 112, and display devices 114. The encoded video sources provide encoded video streams to the CMTS via the IP transport network. In an embodiment, the encoded video sources provide video streams that are encoded according to an MPEG encoding standard, including, for example, MPEG-1 and MPEG-2. Additionally, the encoded video streams are encoded using VBR encoding and each VBR encoded video stream can be characterized by a peak rate and a mean rate. The peak and mean rates can be expressed together as a peak-to-mean ratio. The encoded video sources include, for example, encoders that are connected to receive video content and video servers, such as VOD and advertisement servers that store encoded video content.

The IP transport network 104 is a network that connects the encoded video sources 102 to the CMTS 106 of the access network 108. The IP transport network forwards IP packets based on IP header information, for example, the destination IP address of the IP packets, which in this case is the IP address of the video receiver such as the IP STB 112. The IP transport network may also include edge routers and switches through which the IP packets pass. Additionally, the IP transport network may be the entry/exit point for other IP services such as Internet and voice over IP (VoIP) services. The IP transport network may utilize additional transport protocols such as multi-protocol label switching (MPLS) to forward IP packets through the transport network. Although FIG. 1 depicts VBR encoded video streams as being provided to the CMTS only through the IP transport network, VBR encoded video streams can be provided directly to the CMTS from other sources, for example, via a video hub office (VHO) that includes encoders and/or content servers, e.g., VOD and/or advertisement servers.

The CMTS 106 provides the interface between the encoded video sources 102 and the access network 108. In an embodiment, the CMTS manages IP packets using the data over cable service interface specifications (DOCSIS), for example, DOCSIS 3.0. In an embodiment, the CMTS uses DOCSIS to communicate IP packets from the CMTS to the CMs 110. The CMTS also includes a video traffic manager 116 that is configured to implement IP-based statmuxing of VBR encoded video streams as is described in more detail below. For example, in order to implement IP-based statmuxing of VBR encoded video streams, the video traffic manager controls the admission of VBR steams to an access channel and controls the size of queues that are used for buffering and scheduling the VBR encoded video streams. The CMTS may be an integrated CMTS or a modular CMTS.

The CMs 110 interface between the CMTS 106 and end-user devices. The CMs utilize DOCSIS to communicate with the CMTS. In an embodiment, the CMs are IP hosts that have their own IP addresses and connect to the IP STBs via Ethernet connections. In another embodiment, the functionality of the CMs is embedded into the IP STBs. The CMs can be connected to various different end-user devices that support voice, video, and/or data services and include, for example, computers, telephones, televisions, STBs, and IP-compatible STBs. The CMs may also include router functionality.

The IP STBs 112 depicted in FIG. 1 are configured to receive IP packets from the CMs 110 and to de-encapsulate the received IP packets. In an embodiment, each IP STB includes a buffer that allows IP packets and/or de-encapsulated MPEG encoded video streams to be buffered before being provided to the respective display device. The buffer enables an IP STB to tolerate a certain amount of jitter in the receipt of the video-carrying IP packets. The amount of jitter that can be tolerated by an IP STB is a function of the buffer size. The IP STBs may also perform video decoding although video decoding may alternatively be done by the display devices 114. In addition to supporting downstream communications, the IP STBs can also support upstream communications.

Although a cable-based access network is described with reference to FIG. 1, the techniques described herein are also applicable to other types of access networks including, for example, digital subscriber line (DSL) networks, passive optical networks (PONs), and wireless access networks. DSL networks typically include IP DSL access multiplexers (DSLAMs) at the edge and residential gateways at the user end. PONs typically include optical line terminals (OLTs) at the edge and optical network terminals (ONTs)/optical network units (ONUs) at the user end. Wireless access networks typically include wireless base stations (BTSs) at the edge and wireless customer premises equipment (CPE) at the user end. In another alternative embodiment, the CMTS is replaced with a video bypass QAM device to create a special IP transport path for video. In this embodiment, the video traffic manager 116 can be part embodied within the QAM devices.

The technique is now described in more detail with reference to FIGS. 2-7. DOCSIS 3.0 includes a packet-based downstream channel bonding protocol that utilizes DOCSIS bonded groups. A DOCSIS bonded group is a group of QAM channels that together form a wide band DOCSIS communications channel. In an embodiment, the DOCSIS bonded group shares a common bandwidth limitation. Once a DOCSIS bonded group is identified, multiple VBR encoded video streams can be assigned to the DOCSIS bonded group. A statmuxing algorithm is used to select which of the VBR encoded video streams are admitted to the same DOCSIS bonded group. In an embodiment, the peak and mean rates of each VBR encoded video stream are used to determine if a particular VBR encoded video stream should be admitted to a particular DOCSIS bonded group, a process sometimes referred to as "admission control."

Figure 2:
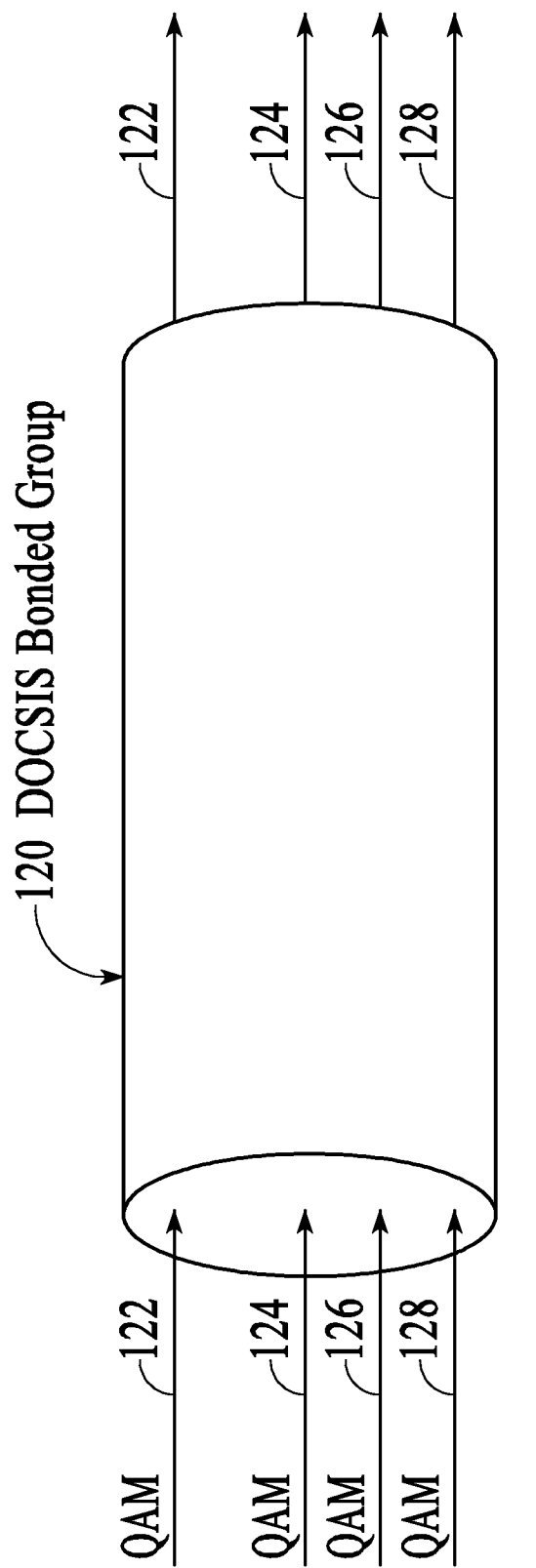
FIG. 2 illustrates a DOCSIS bonded group that is configured according to DOCSIS 3.0.

FIG. 2 illustrates a DOCSIS bonded group 120 that is configured according to DOCSIS 3.0. In the example of FIG. 2, the bonded group includes four QAM channels 122, 124, 126, and 128, although the number of QAM channels can be some number other than four. For example, bonded groups of 8 different QAM channels are common. The bonded group is treated as an access channel between the CMTS and the CMs to deliver different VBR encoded video streams to the CMs. In an embodiment, the bonded group is associated with a bandwidth limitation that identifies a maximum bandwidth that is allocated to the bonded group for transmission through the access network. For example, the bandwidth limitation of a bonded group carrying 4 QAM channels is four times the bandwidth limitation of a single QAM channel.

Although FIG. 2 describes an access channel in terms of a DOCSIS bonded group, other types of access technologies (DSL, PONs, wireless) will have different techniques for implementing access channels.

In the DOCSIS bonded group 120 of FIG. 2, it is assumed that a sum of peak rates from all of the assigned VBR encoded video streams exceeds the bandwidth limitation that is allocated to the DOCSIS bonded group. Although the sum of peak rates from all of the assigned video streams in the DOCSIS bonded group exceeds the bandwidth limitation that is allocated to the DOCSIS bonded group, the likelihood of a bandwidth exceedence, i.e., congestion, is a function of the peak and mean bitrates of the constituent VBR encoded video streams and the statmuxing algorithm. Because VBR encoded video streams are by definition variable, there may be periods when bandwidth demand from the video streams in the DOCSIS bonded group exceeds the bandwidth limitation of the DOCSIS bonded group.

In an embodiment, a technique for managing the distribution of digital video content to multiple end-user devices involves statistically multiplexing multiple VBR encoded video streams into an access channel, such as a DOCSIS bonded group, and utilizing quality of service capabilities of an edge device, such as a CMTS, to buffer and schedule IP packets, which carry the VBR encoded video streams, so that packets are not dropped during periods of congestion. Utilizing the quality of service capabilities of an edge device makes it possible to statistically multiplex VBR encoded video streams in a narrowcast application such as VOD or SDV while eliminating the need for process intensive transrating/transcoding operations. Any jitter added to the VBR encoded video streams as a result of buffering at the edge device can be compensated for with buffering at an end-user device such as an IP-compatible STB.

Figure 3:
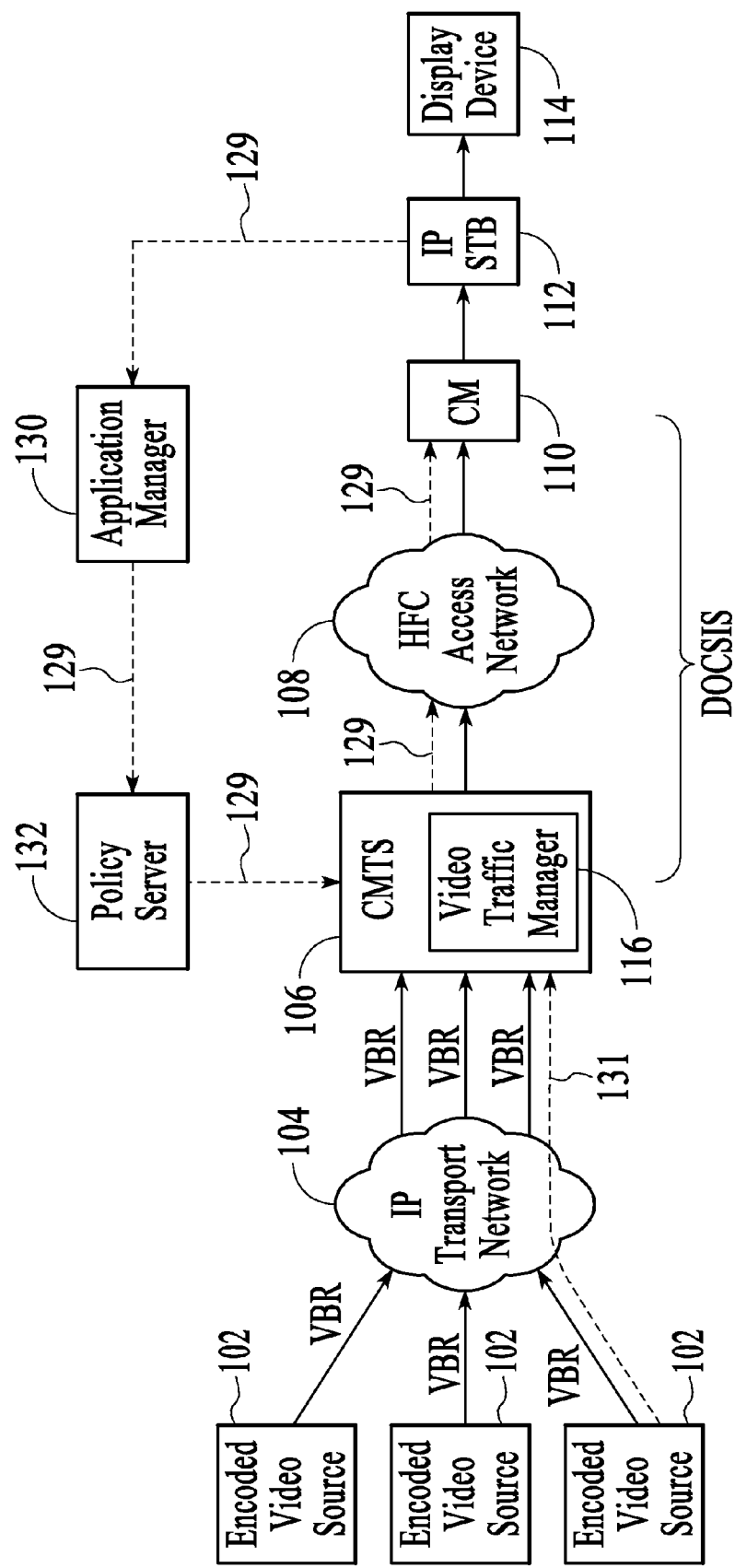
FIG. 3 depicts the system of FIG. 1 with the addition of an application manager and a policy server.

Operation of the system 100 described with reference to FIG. 1 is now described with reference to FIG. 3. The description includes a particular emphasis on those operations that enable IP-based statmuxing of VBR encoded video streams. FIG. 3 is similar to FIG. 1 except that FIG. 3 depicts only one CM 110, one IP STB 112, and one display device 114 and also depicts an application manager 130 and a policy server 132. The application manager manages session setup and can be, for example, a VOD session manager or an SDV session manager. The application manager can be a centralized component or distributed components. The policy server manages policy decisions (e.g., access control lists, service level agreements, bandwidth limitations, etc.). In FIG. 3, the flow of VBR encoded video streams is indicated by the solid line arrows and the flow of control commands is indicated by dashed line arrows 129. In another embodiment, the policy server and application manager are not relied on for admission control signaling. For example, admission control signaling follows the same path, see dashed line arrow 131, as the video traffic from an encoded video source 102 to the CMTS 106. In an embodiment, an on-path resource reservation protocol such as RSVP can be used as the signaling protocol.

Referring to FIG. 3, VBR encoded video streams are output by the encoded video sources 102 and provided to the CMTS 106 via the IP transport network 104. The CMTS uses statistical multiplexing to assign the incoming VBR encoded video streams to a DOCSIS access channel, e.g., a DOCSIS bonded group. The CMTS also sets up queues for any DOCSIS access channels that are active within the CMTS. The queues are prioritized within the CMTS such that the VBR encoded video streams in the DOCSIS access channels have a higher priority than IP packets carrying best effort delivery data (e.g., packets that use TCP). In an embodiment, the sizes of the queues in the CMTS are chosen so that the total jitter introduced by a queue is less than a pre-determined jitter threshold. In an embodiment, the pre-determined jitter threshold is set to an interval that will not impart jitter on the VBR encoded video streams of more than the jitter tolerance of the IP STBs 112. In particular, the end-to-end jitter experience by the VBR encoded video streams must be less than the jitter tolerance of the IP STBs. To ensure that the end-to-end jitter experience by the VBR encoded video streams is less than the jitter tolerance of the IP STBs, queues at the edge device must be sized so that jitter contributed by the edge device plus jitter contributed by any other portions of the end-to-end connection is still less than the jitter tolerance of the IP STBs.

Since a DOCSIS access channel is a shared media, the jitter introduced by IP-based statmuxing affects all of the IP STBs in the service group. Therefore, the worst jitter tolerance of all of the IP STBs in a service group must be considered when configuring the jitter threshold on the CMTS. For example, the queue sizes should be chosen such that the jitter introduced as a result of statmuxing can be removed by all IP STBs in the service group. In an embodiment, the depth of each queue is set as a function of the total bandwidth of the DOCSIS bonding group and the maximum jitter that can be tolerated by the IP STBs. For example, the depth of each queue is set as the total available bandwidth for the queue multiplied by a predetermined maximum jitter threshold so that no packets will be delayed more than the predetermined maximum jitter threshold.

In an embodiment, a priority based queuing technique is used and the total available bandwidth for the queue is the total bandwidth of the access channel not including the maximum combined bandwidth of any higher priority queues. For example, in a DOCSIS bonded group that includes four QAM channels, there may be a voice queue, a video queue, and a best effort queue, with the voice queue having the highest priority and the best effort queue having the lowest priority. There is an upper limit on how much bandwidth the voice traffic can consume and the total available bandwidth for the video queue is the bandwidth of four QAM channels minus the upper limit on the voice traffic bandwidth. In an enhancement, an administrator can configure the jitter threshold of the edge device through a management interface. Additional details related to the buffering and scheduling of the VBR encoded video streams is described below with reference to FIGS. 6 and 7.

Referring again to FIG. 3, the CMTS 106 outputs the VBR encoded video streams that are IP statmuxed into a DOCSIS bonded group. The VBR encoded video streams are passed through the HFC access network 108 using the DOCSIS bonded group and received at the CM 110. The CM terminates the DOCSIS connection and forwards the video-carrying IP packets to the IP STB 112. The IP STB buffers the IP packets (if necessary), de-encapsulates the VBR encoded video streams, and decodes the VBR encoded video stream. The decoded video stream is then passed to the display device 114 for display.

An example of a bandwidth control operation is also described with reference to FIG. 3. In an embodiment, the IP STB 112 sends a control command (e.g., an application layer message) to the application manager requesting a video stream. The application manager reserves bandwidth in the HFC access network 108 through the policy server 132 or directly from the CMTS 106 and the CMTS controls the CMs 110 and the bandwidth utilization within the DOCSIS network.

In an embodiment, the peak and mean bitrates of a VBR encoded video stream should be known to the application manager 130 and the policy server 132 and/or the CMTS 106 so that the mean and peak bitrates can be used to determine whether or not a VBR encoded video stream should be admitted to a DOCSIS bonded group. The buffering of VBR encoded video streams at the CMTS 106 can be controlled to manipulate the peak-to-mean ratio of the VBR encoded video streams. In an embodiment, the peak and mean bitrates of a VBR encoded video stream are not used directly for statmuxing admission control. Rather, the peak and mean bitrates after buffering within the CMTS are used for making statmuxing admission control decisions. In particular, a projected post-buffering peak-to-mean ratio is used for making statmuxing admission control decisions because the post-buffering peak-to-mean ratios for VBR stream are typically lower after buffering, which leads to smaller peak-to-mean ratios and more efficient statmuxing. In an embodiment, a heuristic based table and a normalized edge router buffer size are used to find out the projected peak rate of a VBR encoded video stream after the stream has been buffered by the CMTS.

In an embodiment, VBR bitrate information is utilized to make admission control decisions. The VBR bitrate information includes the VBR average bitrate and VBR peak bitrate. In an embodiment, the average bitrate is calculated as the long term bitrate average, e.g. for the duration of a session and the peak bitrate is calculated as the maximum instantaneous bitrate. The instantaneous bitrate can be calculated with available timing information such as timestamps from the video stream. Using MPEG encoded video as an example, if an elementary stream is transmitted directly, the instantaneous bitrate is calculated frame by frame. The rate can be defined as the number of bits of a frame divided by the frame interval. For example, in Phase Alternating Line (PAL) video encoding, there are twenty-five video frames per second, which translates to a frame interval of 40 ms. If video is transmitted using an MPEG transport stream, the instantaneous bitrate is calculated in each Peak Cell Rate (PCR) interval. For example, the bitrate is calculated as the total number of video bits between two adjacent PCR carrying MPEG transport stream packets divided by the difference of PCR stamps carried in the two MPEG transport stream packets.

In an embodiment, the edge device which does the admission control of VBR encoded video streams considers the post-buffering aggregate bitrate information to make admission control decisions. This takes into consideration that MPEG streams tend to have smaller peak-to-mean ratios after buffering of multiple streams, where the post buffering rate refers to the measured rate of the flow after it has been buffered and scheduled by the edge device. The post-buffering peak-to-mean ratio is derived from the original peak-to-mean ratio and the edge device buffer size. Stream information, such as peak rate and mean rate, is signaled from the video source to the edge device via a separate control plane. The edge device buffer size can be normalized and represented as the maximum jitter introduced by the buffer. For example, if the bandwidth for video transmission in an access channel is 40 Mbps and the buffer size is 40 k bits, then a maximum of 100 ms of network jitter can be introduced. In an embodiment, a heuristic based table and the normalized buffer size are used to find out the projected peak rate of a VBR encoded video stream after the stream has been buffered.

In an embodiment, a probability model is used for admission control. For example, an acceptable error rate is set, e.g., an error rate of $10^{(-7)}$, which is roughly equivalent to 1 defect for every 20 hours of video transmission. A particular VBR encoded video stream can be admitted to an access channel if the possibility of all streams in the bonded group having a bandwidth overflow is less than a pre-configured tolerable packet drop probability.

Using advanced VBR admission control techniques, a VBR encoded video stream can be admitted to an access channel if the total available bandwidth for VBR encoded video in the access channel is greater than the aggregate VBR effective bandwidth. The available bandwidth for VBR encoded video excludes all bandwidth reserved for higher priority traffic and for CBR video traffic in the transmission channel. The aggregate VBR effective bandwidth can be defined as: Sum (VBR_average_rate*VBR_efficiency_factor), where the VBR_efficiency_factor is a function of factors including but not limited to the post-buffering peak-to-mean ratio, the number of VBR streams in the channel, and the tolerable packet drop probability. In one embodiment, simulations are used to derive tables that map the post-buffering peak-to-mean ratio, the number of VBR streams in the channel, and the tolerable packet drop probability to a VBR_efficiency_factor.

Figure 4:
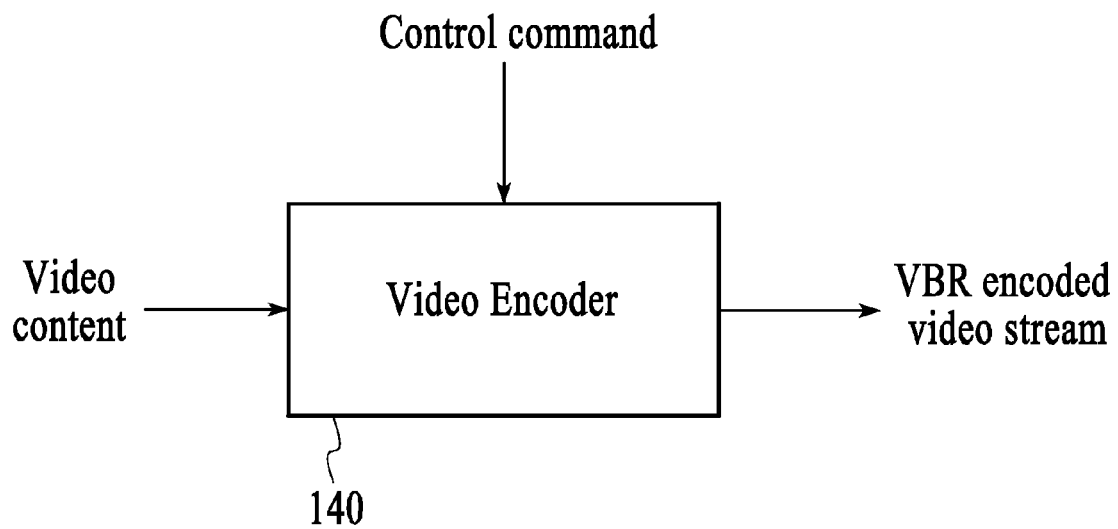
FIG. 4 depicts a video encoder that is controlled to adjust the mean and/or peak rate of the VBR encoded video stream.
Figure 5:
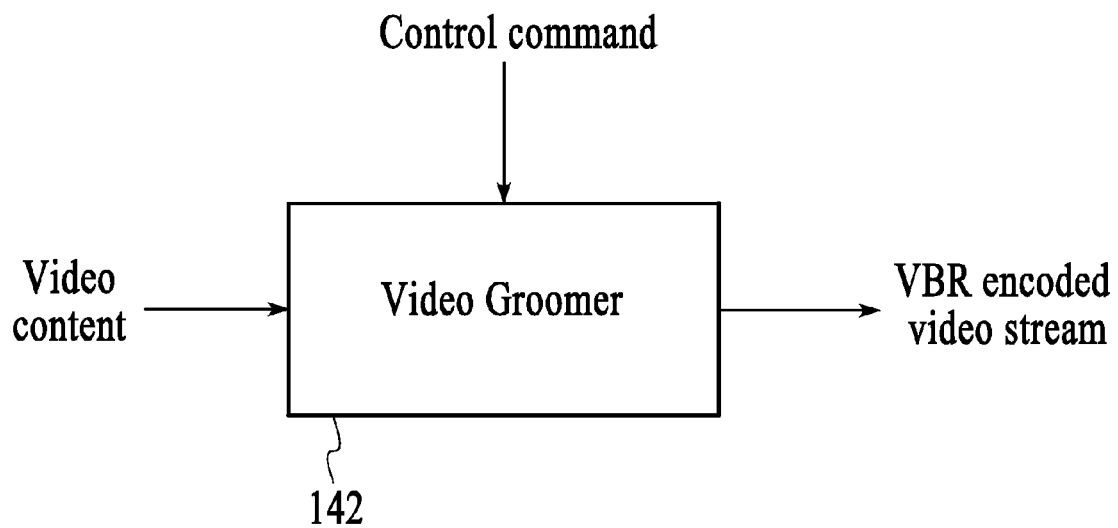
FIG. 5 depicts a video groomer that is controlled to adjust the mean and/or peak rate of the VBR encoded video stream.

In an embodiment, the encoded video source 102 can be used to control the mean and peak bitrate of the VBR encoded video streams. This is especially useful for local content that is under the control of cable operators. FIG. 4 depicts a video encoder 140 that is controlled by a control command to adjust the mean and/or peak rate of the VBR encoded video stream. On the other hand, if the original video content is out of the control of cable operators, a video groomer can be used to control the mean and peak rate of VBR video streams. FIG. 5 depicts a video groomer 142 that is controlled by a control command to adjust the mean and/or peak rate of the VBR encoded video stream. Operators can control the video quality through the peak and mean rate adjustments via a video encoder and/or a video groomer. The efficiency of VBR statmuxing is defined as the maximum average percentage of total available bandwidth used for VBR encoded video streams in a transmission channel that introduces less than a predefined packet drop rate, e.g., 1E-6. Since the efficiency of IP statmuxing is related to the peak-to-mean ratio of the VBR encoded video streams, network operators can adjust the peak-to-mean ratio of the VBR encoded video streams at video sources to adjust the efficiency with which the corresponding access channel is utilized. For example, when the typical CMs can bond 3 QAM channels in a DOCSIS bonded group, a smaller peak-to-mean ratio may be used to achieve better efficiency.

Figure 6:
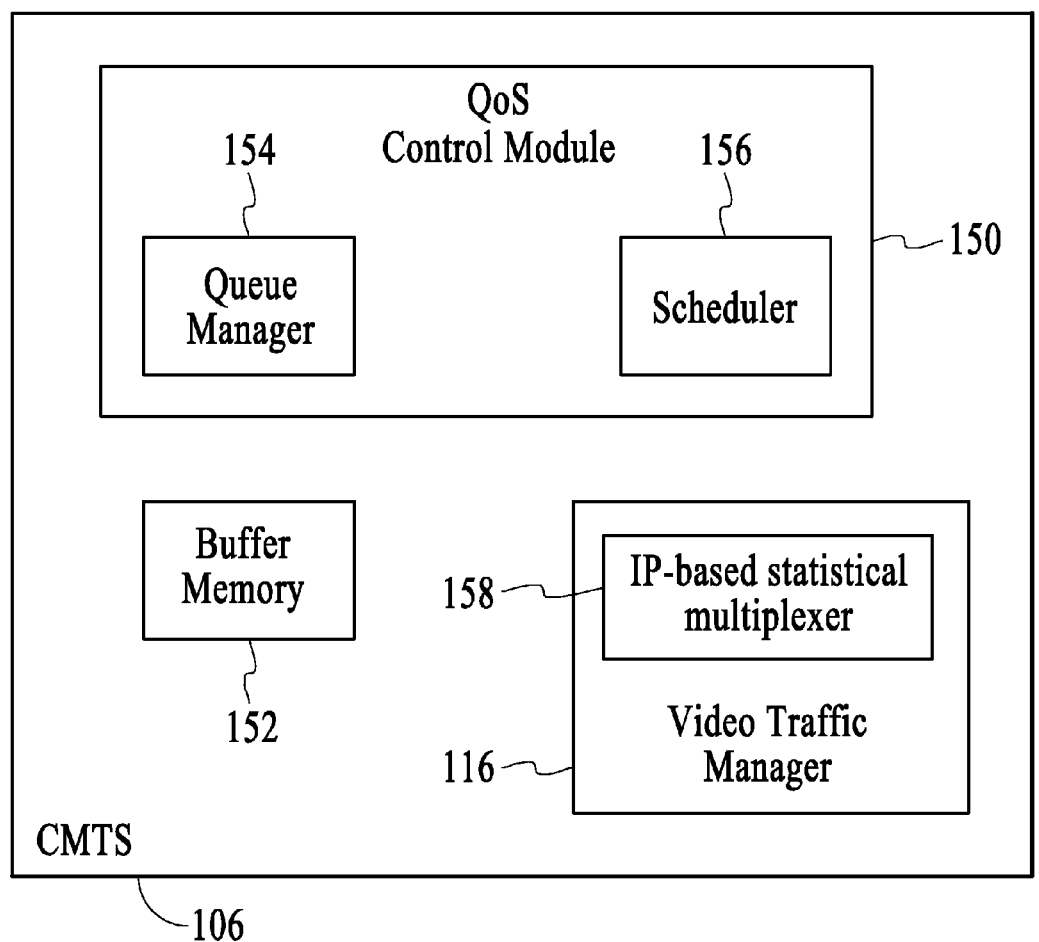
FIG. 6 depicts a functional block diagram of the CMTS from FIGS. 1 and 3.

FIG. 6 depicts a functional block diagram of the CMTS 106 from FIGS. 1 and 3. The CMTS includes a quality of service control module 150, buffer memory 152, and the video traffic manager 116. The quality of service control module includes a queue manager 154 and a scheduler 156. The quality of service control module controls the buffering, queuing, and scheduling of packetized traffic through the CMTS. The video traffic manager manages the above-described IP-based statmuxing of IP packets that carry VBR encoded video streams. In the embodiment of FIG. 6, the video traffic manager includes an IP-based statistical multiplexer 158 that manages the admission control of VBR encoded video streams into DOCSIS bonded groups.

As described above, the efficiency with which the access channel is utilized can be controlled by adjusting the peak-to-mean ratios of the VBR encoded video streams by devices external to the network prior to transmission. For example, a video source, which signals peak and mean bitrates to nodes within the network (either on-path via RSVP or off-path via a policy server), enforces the peak and mean bitrate signaled during setup of the video session. A smaller peak-to-mean ratio means better statistical multiplexing efficiency, which will increase the probability of a successful admission control decision. If the video source involves end-user interaction such as trick play for VOD servers, two techniques can be used to handle the end-user interaction. In one embodiment the video source enforces the VBR peak and mean rate even during the trick play time. In another embodiment, the admission control function allows for the addition of some excess bandwidth for the bitrate signaled to the edge router to accommodate for trick play operations. The trick mode attributes and projected impact on bandwidth can be signaled at the time the admission control function is occurring.

In another embodiment where user-interaction, such as trick-play, or operations that cause new content to be substituted are encountered, an enhancement to the admission control logic can be added that profiles the peak-to-mean rate increase projected from such interactive actions. The information can be profiled universally for all content, or specific to an individual piece of content, or specific to an individual user or class of user. A further enhancement is to derive the bandwidth impact of such user-interaction from monitored information from other sessions and other users. A given piece of content may have an interactive usage profile that is specific to that content, but is not known until other users have exhibited that behavior.

Figure 7:
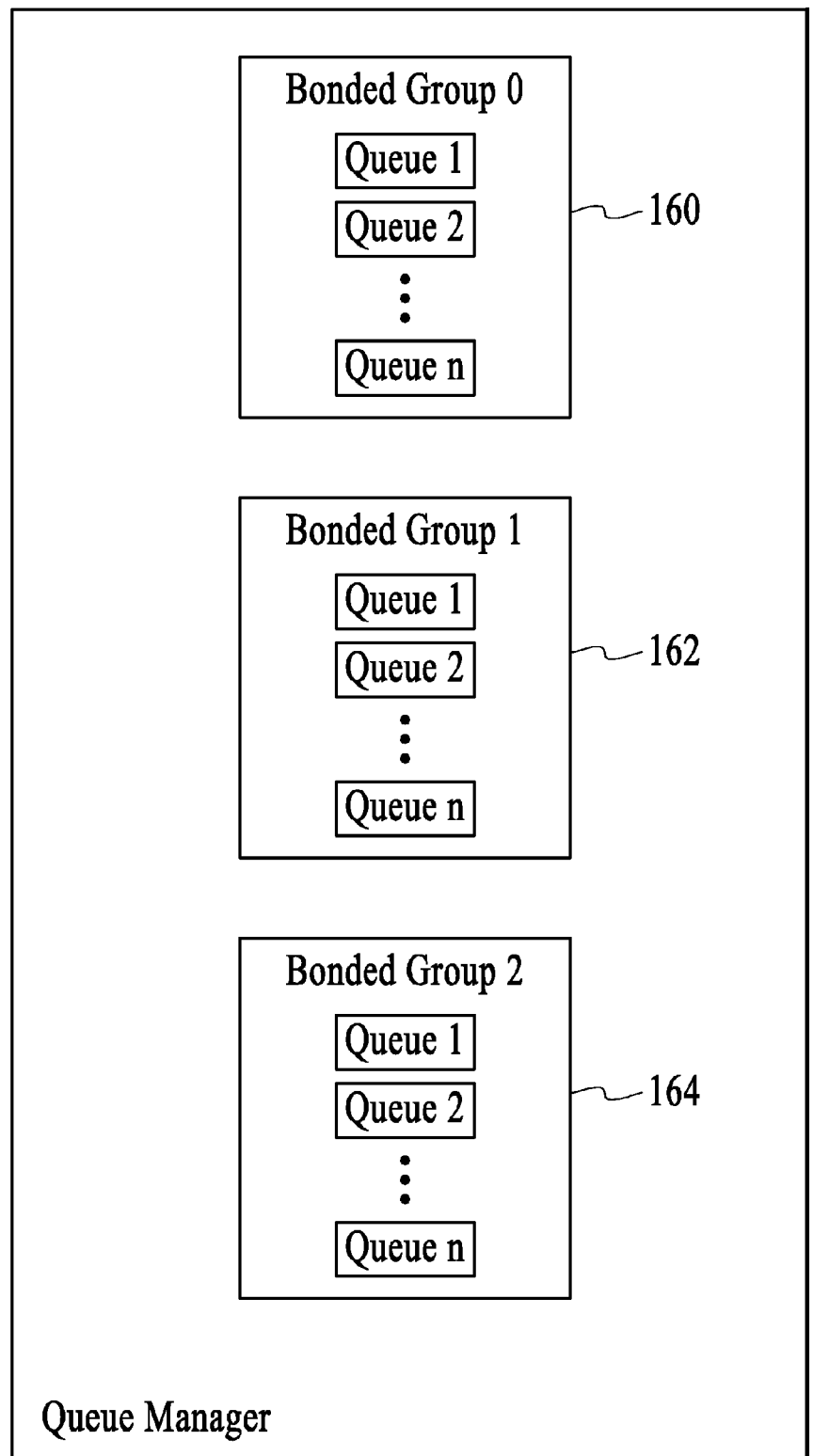
FIG. 7 depicts an expanded view of the queue manager from FIG. 6.

FIG. 7 depicts an expanded view of the queue manager 154 from FIG. 6. The queue manager includes separate queue groups 160, 162, and 164 for each of three different bonded groups. Each queue group includes multiple group-specific queues, which may include a queue or queues that are specific to, for example, voice traffic, video traffic, and/or best effort traffic. The queue groups enable the quality of service control module to individually control the buffering and scheduling of each bonded group. Although a few queue groups are depicted in FIG. 7, the queue manager may include more queue groups and each queue group may include more group-specific queues.

Figure 8:
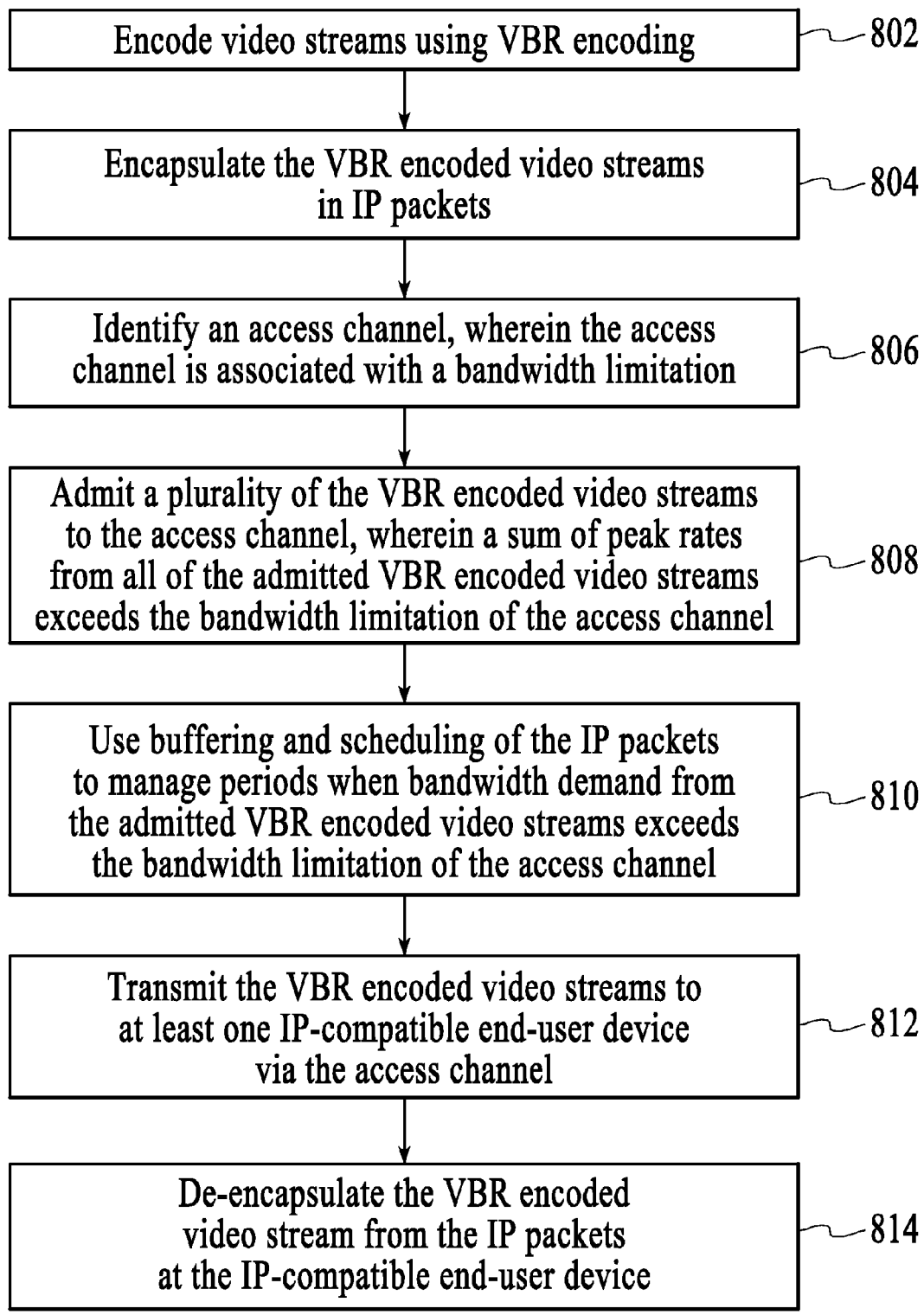
FIG. 8 is a process flow diagram of a method for distributing digital video content to multiple end-users.

FIG. 8 is a process flow diagram of a method for distributing digital video content to multiple end-users. At block 802, video streams are encoded using VBR encoding. At block 804, the VBR encoded video streams are encapsulated in IP packets. At block 806, an access channel is identified, wherein the access channel is associated with a bandwidth limitation. At block 808, a plurality of the VBR encoded video streams are admitted to the access channel, wherein a sum of peak rates from all of the admitted VBR encoded video streams exceeds the bandwidth limitation of the access channel. At block 810, buffering and scheduling of the IP packets are used to manage periods when bandwidth demand from the admitted VBR encoded video streams exceeds the bandwidth limitation of the access channel. The buffering helps manage the occasional bandwidth oversubscription while limiting the jitter introduced by the CMTS. At block 812, the VBR encoded video streams are transmitted to at least one IP-compatible end-user device via the access channel. At block 814, the VBR encoded video stream is de-encapsulated from the IP packets at the IP-compatible end-user device.

Figure 9:
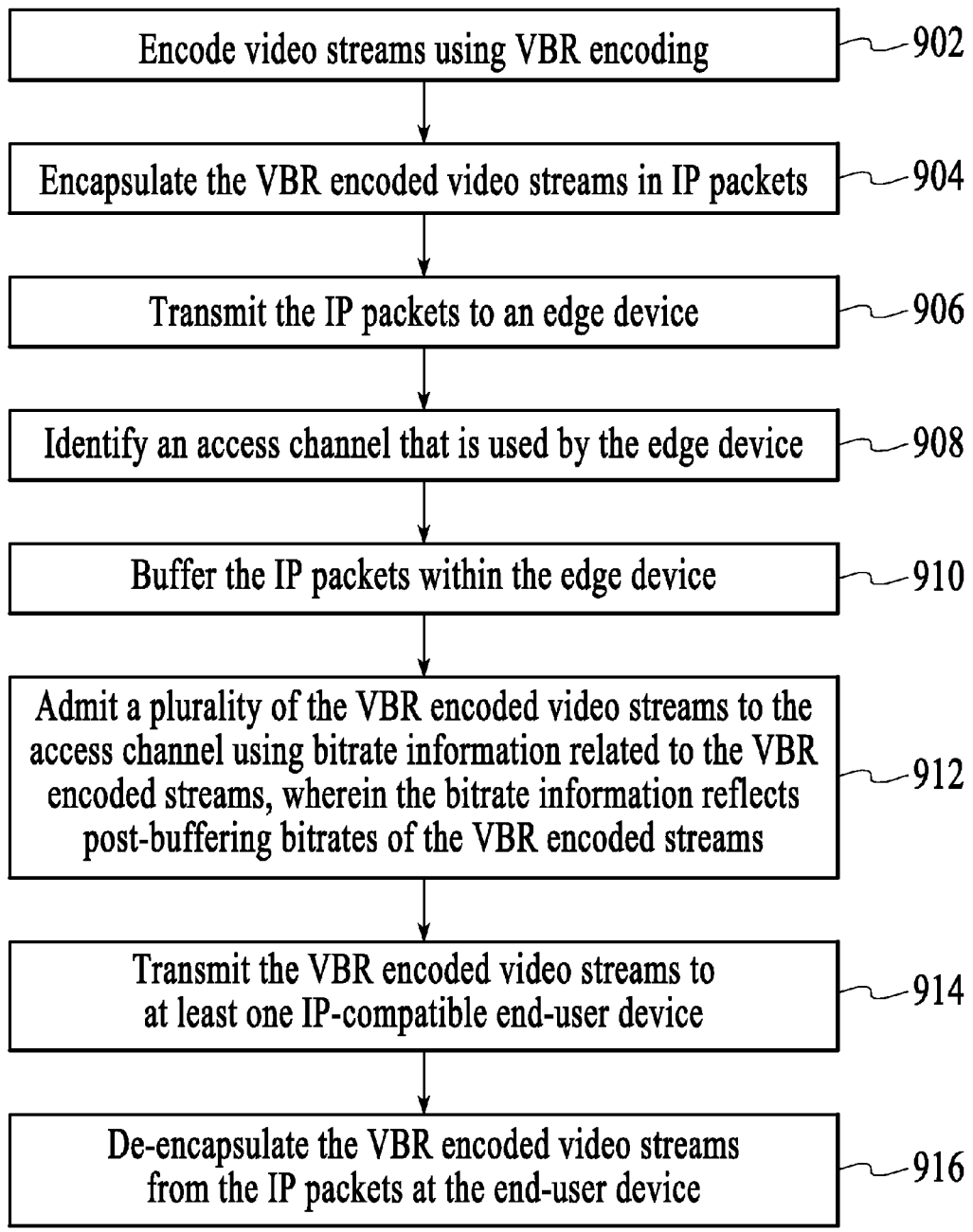
FIG. 9 is a process flow diagram of another method for distributing digital video content to multiple end-users.

FIG. 9 is a process flow diagram of another method for distributing digital video content to multiple end-users. At block 902, video streams are encoded using VBR encoding. At block 904, the VBR encoded video streams are encapsulated in IP packets. At block 906, the IP packets are transmitted to an edge device. At block 908, an access channel that is used by the edge device is identified. At block 910, the IP packets are buffered within the edge device. At block 912, a plurality of the VBR encoded video streams are admitted to the access channel. For example, the VBR encoded video streams are admitted to the access channel using advanced admission control techniques, including consideration of, for example, VBR average bitrate, post-buffering peak-to-mean ratio, the number of VBR streams in the access channel, and the tolerable packet drop probability. At block 914, the VBR encoded video streams are transmitted to at least one IP-compatible end-user device. At block 916, the VBR encoded video streams are de-encapsulated from the IP packets at the end-user device.

Although specific embodiments of the invention have been described and illustrated, the invention is not to be limited to the specific forms or arrangements of parts as described and illustrated herein. The invention is limited only by the claims.

What is claimed is:

1. A method for distributing digital video content to multiple end-users, the method comprising:
receiving an encoded video stream at an edge device, wherein the encoded video stream is encoded using variable bitrate (VBR) encoding and wherein the VBR encoded video stream is encapsulated in Internet Protocol (IP) packets;
identifying an access channel for the video stream, wherein the access channel is associated with a bandwidth limitation;
admitting the VBR encoded video stream to the access channel, wherein a sum of peak rates from all of the admitted VBR encoded video streams exceeds the bandwidth limitation of the access channel;
buffering, at the edge device, the admitted VBR encoded video stream, wherein buffering comprises creating at least one queue for the IP packets and assigning a priority to the at least one queue such that the VBR encoded video stream in the access channel have a higher priority;
transmitting the IP packets from the at least one queue on the edge device based on the priority of the queue to at least one IP-compatible end-user device via the access channel such that the VBR encoded video stream can be de-encapsulated from the IP packets at the IP-compatible end-user device;
wherein the VBR encoded video stream is transmitted to the at least one IP-compatible end-user device using data over cable service interface specifications (DOCSIS), wherein the access channel is associated with a DOCSIS bonded group;

wherein creating at least one queue comprises adjusting a depth of the at least one queue wherein the depth of the at least one queue is adjusted based on a total bandwidth of the access channel and a maximum jitter than can be tolerated by the end-user device; and wherein adjusting the depth of the queue comprises adjusting the depth of the queue based on an available bandwidth of the queue wherein available bandwidth of the queue is the total bandwidth of the access channel not including the maximum combined bandwidth of any higher priority queues.

2. The method of claim 1 wherein the VBR encoded video stream is admitted to the access channel based on post-buffering data rates.

3. The method of claim 1 wherein VBR encoded video stream is admitted to the access channel based on at least one of: mean bitrates of the VBR encoded video stream, post buffering peak-to-mean ratios of the VBR encoded video stream, a number of VBR encoded video streams in the access channel, and a pre-established packet drop probability.

4. The method of claim 3 wherein the edge device is a cable modem termination system (CMTS).

5. The method of claim 1, wherein creating at least one queue comprises:
identifying a jitter tolerance at the IP-compatible end-user device; and
determining a size of the at least one queue such that an end-to-end jitter experienced by the VBR encoded video stream is less than the jitter tolerance at the IP-compatible end-user device.

6. The method of claim 1 further comprising decoding the VBR encoded video stream and displaying the video stream.

7. The method of claim 1 further comprising adjusting a peak to mean ratio of a VBR encoded video stream in order to adjust the efficiency with which the access channel is utilized.

8. A system for distributing digital video content to multiple end-user devices, the end-user devices being configured to receive and buffer IP packets of variable bitrate (VBR) encoded video streams and to de-encapsulate the VBR encoded video streams, the system comprising:
an edge device configured to receive video streams that are encoded using VBR encoding and encapsulated in Internet Protocol (IP) packets, wherein the edge device is further configured to:
admit a plurality of the VBR encoded video streams to an access channel, wherein the access channel has a bandwidth limitation and wherein a sum of peak rates from all of the admitted video streams exceeds the bandwidth limitation of the access channel;
buffer, at the edge device, the admitted VBR encoded video stream, wherein buffering comprises creating at least one queue for the IP packets and assigning a priority to each of the at least one queue such that the VBR encoded video stream in the access channel have a higher priority; and
transmit the IP packets from the at least one queue to the end-user devices based on the priority of the queue;
wherein the edge device distributes the IP packets to the end-user devices using data over cable service interface specifications (DOCSIS) and wherein the access channel is a DOCSIS bonded group;
wherein creating at least one queue comprises adjusting a depth of the at least one queue wherein the depth of the at least one queue is adjusted based on a total bandwidth of the access channel and a maximum jitter than can be tolerated by the end-user device; and
wherein adjusting the depth of the queue comprises adjusting the depth of the queue based on an available bandwidth of the queue wherein available bandwidth of the queue is the total bandwidth of the access channel not including the maximum combined bandwidth of any higher priority queues.

9. The system of claim 8 wherein the edge device admits the VBR encoded video streams to the access channel based on post-buffering data rates.

10. The system of claim 9 wherein the edge device is a cable modem termination system (CMTS) and the end-user devices are IP set top boxes (STBs).

11. The system of claim 8, wherein the edge device admits VBR encoded video streams to the access channel based on at least one of: mean bitrates of the VBR encoded video streams, post buffering peak-to-mean ratios of the VBR encoded video streams, the number of VBR encoded video streams in the access channel, and a pre-established packet drop probability.

12. The system of claim 11 wherein the edge device is a cable modem termination system (CMTS).

13. The system of claim 8 wherein the end-user devices have a jitter tolerance and wherein the VBR encoded video streams being buffered at the edge device such that an end-to-end jitter experienced by the VBR encoded video streams is less than the jitter tolerance at the end-user devices.

14. The system of claim 8 further comprising encoded video sources connected to provide the VBR encoded video streams to the edge device, wherein the encoded video sources are controlled to adjust a peak to mean ratio of VBR encoded video streams in order to adjust the efficiency with which the access channel is utilized.

15. The system of claim 8 wherein the edge device includes a quality of service control module having a queue manager and a scheduler, wherein the quality of service control module controls the buffering, queuing, and scheduling of the IP packets through the edge device.

16. A method for distributing digital video content to multiple end-users, the method comprising:
receiving encoded video streams at an edge device, wherein the encoded video streams are encoded using variable bitrate (VBR) encoding and wherein the VBR encoded video streams are encapsulated in Internet Protocol (IP) packets;
identifying an access channel that is used by the edge device;
buffering the VBR encoded video streams, wherein buffering comprises creating at least one queue for the IP packets and assigning a priority to the at least one queue within the edge device such that the VBR encoded video stream in the access channel have a higher priority;
admitting a plurality of the VBR encoded video streams to the access channel using bitrate information related to the VBR encoded streams, wherein the bitrate information reflects post-buffering bitrates of the VBR encoded streams;
transmitting the VBR encoded video streams from the edge device to at least one IP-compatible end-user device such that the VBR encoded video streams can be de-encapsulated from the IP packets at the end-user device;
wherein the access channel is associated with a bandwidth limitation and wherein a sum of peak rates from all of the admitted video streams exceeds the bandwidth limitation of the access channel and wherein buffering and scheduling of the IP packets is used to manage periods when bandwidth demand from the admitted VBR encoded video streams exceeds the bandwidth limitation of the access channel;

wherein the VBR encoded video streams are transmitted to the at least one IP-compatible end-user device using data over cable service interface specifications (DOCSIS), wherein the access channel is associated with a DOCSIS bonded group;

wherein creating at least one queue comprises adjusting a depth of the at least one queue wherein the depth of the at least one queue is adjusted based on a total bandwidth of the access channel and a maximum jitter than can be tolerated by the end-user device; and wherein adjusting the depth of the queue comprises adjusting the depth of the queue based on an available bandwidth of the queue wherein available bandwidth of the queue is the total bandwidth of the access channel not including the maximum combined bandwidth of any higher priority queues.

17. The method of claim 16 further comprising adjusting a peak to mean ratio of a VBR encoded video stream in order to adjust the efficiency with which the access channel is utilized.

18. The method of claim 16 wherein the edge device is a cable modem termination system (CMTS).

* * * * *